United States Patent [19]

Matsumoto et al.

[11] Patent Number: 5,694,190
[45] Date of Patent: Dec. 2, 1997

[54] LIQUID CRYSTAL DISPLAY DEVICE HAVING LIGHT GUIDING PLATE DISPOSED BETWEEN CIRCUIT BOARD AND DISPLAY PANEL

[75] Inventors: Takumi Matsumoto, Kitakatsuragi-gun; Kenichi Ukai, Uda-gun, both of Japan

[73] Assignee: Sharp Kabushiki Kaisha, Osaka, Japan

[21] Appl. No.: 563,791

[22] Filed: Nov. 28, 1995

[30] Foreign Application Priority Data

Dec. 13, 1994 [JP] Japan .................... 6-309039

[51] Int. Cl.⁶ .................... G02F 1/1345; G02F 1/1335
[52] U.S. Cl. .................... 349/151; 349/58; 349/65; 349/152
[58] Field of Search .................... 359/87, 88, 83, 359/48, 50; 361/681, 785; 439/59, 62, 64, 69, 74, 79; 174/59, 260; 362/26, 31; 349/65, 149, 151, 152, 58

[56] References Cited

U.S. PATENT DOCUMENTS

| | | | |
|---|---|---|---|
| 4,142,226 | 2/1979 | Mears | 361/681 |
| 4,483,581 | 11/1984 | Kourimsky et al. | 439/634 |
| 4,629,289 | 12/1986 | Streit | 359/88 |
| 4,976,429 | 12/1990 | Nagel | 353/122 |
| 4,977,456 | 12/1990 | Furuya | 348/333 |
| 5,067,796 | 11/1991 | Suzuki et al. | 359/88 |
| 5,293,262 | 3/1994 | Adachi et al. | 359/88 |
| 5,489,999 | 2/1996 | Matsumoto | 349/62 |

*Primary Examiner*—William L. Sikes
*Assistant Examiner*—Tai V. Duong
*Attorney, Agent, or Firm*—Nixon & Vanderhye

[57] ABSTRACT

A signal input electrode portion formed on a liquid crystal display panel which has driver LSIs outputting signals for driving picture elements is detachably inserted from a side direction thereof into and is connected to a connector mounted on a circuit board for supplying electric power and input signals to the liquid crystal display panel. The liquid crystal display panel is electrically connected with the circuit board through the connector.

6 Claims, 3 Drawing Sheets

LIQUID CRYSTAL DISPLAY DEVICE HAVING LIGHT GUIDING PLATE DISPOSED BETWEEN CIRCUIT BOARD AND DISPLAY PANEL

BACKGROUND OF THE INVENTION (1) Field of the Invention

The present invention relates to a liquid crystal display device, and particularly relates to a liquid crystal display device having a liquid crystal display panel on which a liquid crystal panel driver LSI is mounted and a circuit board. More detailedly, the present invention relates to a liquid crystal data display device to be used for a lap-top computer, car navigation system etc., as well as to a liquid crystal display device for television apparatus sets etc.

(2) Description of the Prior Art

Conventionally, a display device using a liquid crystal display panel on which a liquid crystal panel driver LSI is mounted has been disclosed in, for example, Japanese Patent Application Laid-Open Hei 5 No.88193. In this device, a flexible board is connected to a signal input electrode portion of the liquid crystal display panel by use of an anisotropically conductive film or an anisotropically conductive adhesive. Further, this flexible board is connected to another board for signal generation power source or the like.

FIG. 7 is a mounting structure of the liquid crystal display panel disclosed in Japanese Patent Application Laid-Open Hei 5 No.88193. As shown in FIG. 7, a liquid crystal display panel 20 on which a liquid crystal panel driver LSI is mounted is mechanically connected to a flexible circuit board 22 through an anisotropically conductive film 21 while the electrode portion of the liquid crystal display panel 20 is electrically connected to a series of terminals of the flexible circuit board 22.

Here, the liquid crystal display panel 20 shown in FIG. 7 is a display panel in which liquid crystal is sandwiched between electrodes and voltages are applied to the electrodes to vary an amount of incident or reflected light. The driver LSI is composed of integrated circuits (ICs) for outputting driving signals to the liquid crystal display panel 20 and is mounted on the liquid crystal display panel with silver alloy paste or the like. The anisotropically conductive film 21 used for connecting the liquid crystal display panel 20 with the flexible circuit board 22 is prepared by dispersing metallic particles, plastic balls subjected to metal plating or solder particles into a resin. With the film, the mechanical and electrical connections are formed by thermally and mechanically pressing.

The flexible circuit board 22 is formed such that wiring with copper foil etc. is carried out on a polyimide film as a base. This flexible circuit board 22 is constructed so as to directly introduce input terminals of the liquid crystal display panel 20 to output terminals of an external input signal and a power source generating circuit. Alternatively, the board 22 may be constructed so as to collect on the circuit board a power source having the same voltage and the same input signal among input of the liquid crystal display panel 20, and to introduce them to output terminals of the input signal and the power source generating circuit.

Since the conventional liquid crystal display device shown in FIG. 7 uses the anisotropically conductive film for connecting the liquid crystal display panel with the flexible circuit board, heat and mechanical pressure are required to be acted in order to achieve connection with the anisotropically conductive film. Accordingly, the connecting work needs a rather long time and to make matters worse, this operation requires a large-scaled equipment in order to provide heat and mechanical pressure for the connection.

The flexible circuit board connected to the liquid crystal display panel is to be connected to another board for signal generation, power supply source or the like. Therefore, the flexible circuit board must be connected to the board through solder connection, a connector or any other connecting method. Thus, a connection of the flexible circuit board and another board disadvantageously needs many parts and materials as well as procedures. Further, since there are many connection sites for various parts, the electric energy loss is increased due to the accumulation of contact resistances generated at the time of bringing the respective parts into contact with each other. Besides, the flexible circuit board is expensive as compared to a hard-type board formed of phenol resin, glass-epoxy resin or the like as a base.

As stated heretofore, since the liquid crystal display panel and the flexible circuit board are connected by the anisotropically conductive film, if either of the liquid crystal display panel and the flexible circuit board becomes defective, or if the connection between the liquid crystal display panel and the flexible circuit board becomes deficient, or in any other cases, the bonding by the anisotropically conductive film must be peeled off. In order to peel off the bonding because of the connection defect or the deficiency of the flexible circuit board, the anisotropically conductive film adhering to the signal input electrode portion of the liquid crystal display panel must be removed. However, if the cured anisotropically conductive film is removed, damage to the signal input electrode portion of the liquid crystal display panel is large, so that there is a risk of breaking the liquid crystal display panel.

When the boding should be removed due to the defect of the liquid crystal display panel or the connection deficiency, the anisotropically conductive film adhering to the flexible board needs to be removed. In such a case, since the flexible circuit board is soft, it is difficult to remove the adhering anisotropically conductive film, so that the flexible circuit board cannot be reused and is wasted in most cases. Accordingly, in the conventional liquid crystal display devices, there is a problem that there occurs much loss of work and parts upon the replacement of the parts.

SUMMARY OF THE INVENTION

The present invention has been achieved in order to solve the prior art problems described heretofore, and it is therefore an object of the present invention to provide a liquid crystal display device in which components constituting the liquid crystal display device can be easily assembled and easily replaceable, and in which the dimension of the device can be made thin and the ratio of the display screen to the front area of the device body as well as the utility efficiency of the back-light illumination are improved.

In accordance with an aspect of the present invention, there is provided a liquid crystal display device which comprises: a liquid crystal display panel having a circuit outputting signals for driving picture elements; a circuit board for supplying electric power and input signals to the liquid crystal display panel; a signal input electrode portion formed on the liquid crystal display panel, and the signal input electrode portion receiving the electric power and the input signals supplied from the circuit board; and a connector mounted on the circuit board, wherein the signal input electrode portion is detachably inserted into and connected to the connector so as to electrically connect the circuit board with the liquid crystal display panel.

In accordance with the liquid crystal display device thus configurated, it is possible to connect the liquid crystal display panel with the circuit board by only slidingly inserting the liquid crystal display panel or the connector into the other component. The power supply and signal input to the liquid crystal display panel from the circuit board can be done through the connector, whereby it is possible to operate the liquid crystal display panel. Accordingly, there is no need to use a flexible board and the like which are required for the conventional method of connecting. Also, even if either the liquid crystal display panel or the circuit board becomes defective, it is possible to replace any of the components in a short period of time by an easy operation since the connector is detachably inserted into and connected to the liquid crystal display panel.

It is effective that the above liquid crystal display device further comprises: a back-light guiding plate which is disposed between the circuit board and the liquid crystal display panel connected to the circuit board through the connector and emits light from the whole surface thereof, wherein the back-light guiding plate is gradually reduced in thickness toward the connector to have a tapering shape. By this configuration, the circuit board can be disposed on the opposite side of the illuminating surface of the back-light guiding plate along the tapered side thereof. As a result, it is possible to make the liquid crystal display device thinner and it is also possible to increase the ratio of the screen area to the whole screen-side area of the liquid crystal display device, i.e. improve the effective utility ratio of the screen.

It is effective that the above liquid crystal display device further comprises: a backside casing which has board inserting grooves for allowing the circuit board to be inserted therein and has the back-light guiding plate placed therein; and a front-side casing attached to the backside casing so as to cover both the liquid crystal display panel and the circuit board, wherein the liquid crystal display panel is placed on the back-light guiding plate and the circuit board is connected to the liquid crystal display panel through the connector by inserting the circuit board into the backside casing along the board inserting grooves formed on the backside casing. By this configuration, the liquid crystal display panel, the back-light guiding plate and the backside casing provided with the board inserting grooves form a stack structure. Further, the circuit board connected to the liquid crystal display panel by sliding insertion is fixed by the attachment of the front-side casing. As a result, the connection between the liquid crystal display panel and the circuit board as well as holding of the other parts can be done by only assembling operations of the respective components, and the assembly of the components is made easy.

It is effective that in the above configuration, the connector comprises a conductive contact which comes in pressure contact with the signal input electrode portion when the liquid crystal display panel is connected with the circuit board and a supporting member which is made of a mold material for supporting the conductive contact. By this configuration, it is possible to obtain moderate contact resistance for the connection between the liquid crystal display panel and the circuit board without applying any mechanical pressure by the other parts.

Further, in the above configuration, it is desirable that the backside casing facing the back-light guiding plate comprises a light-reflective material. By this configuration, the amount of reflected light on the light-emitting surface, the rear surface and the side surfaces of the back-light guiding plate increases, so that it is possible to improve the light utility efficiency of the back-light. Accordingly, a reflective sheet which has been provided on the rear surface of the back-light guiding plate in the conventional configuration is no more needed.

Further advantages and features of the invention as well as the scope, nature and utilization of the invention will becomes apparent to those skilled in the art from the description of the preferred embodiments of the invention set forth below.

DESCRIPTION OF THE PREFERRED EMBODIMENTS

Embodiments of the invention will hereinafter be described in detail with reference to the accompanying drawings.

Figure 1:
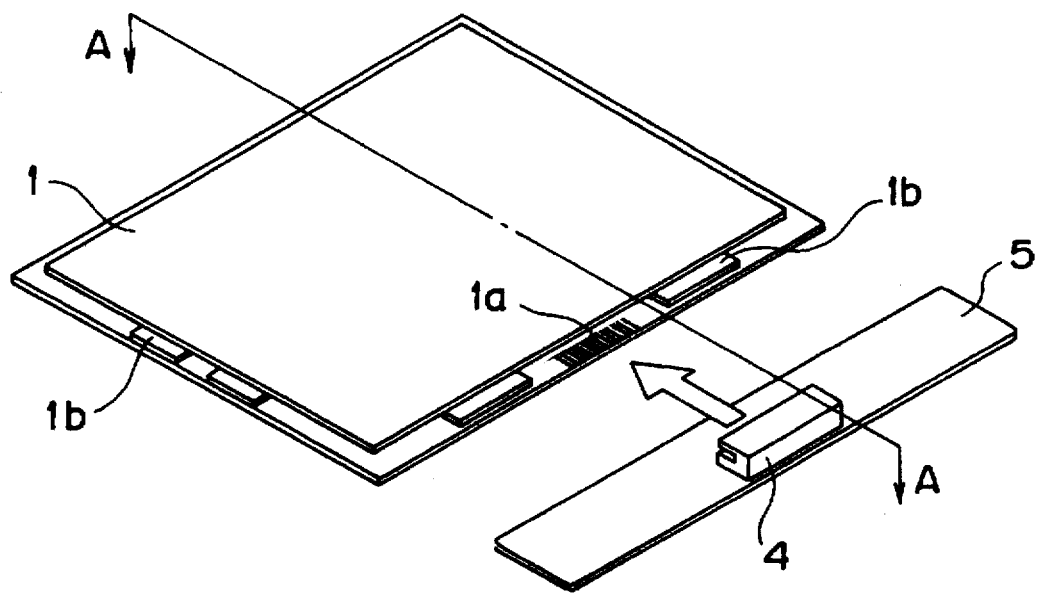
FIG. 1 is a perspective view showing a connecting situation of a liquid crystal display panel and a circuit board having a connector thereon in accordance with the present invention.
Figure 2:
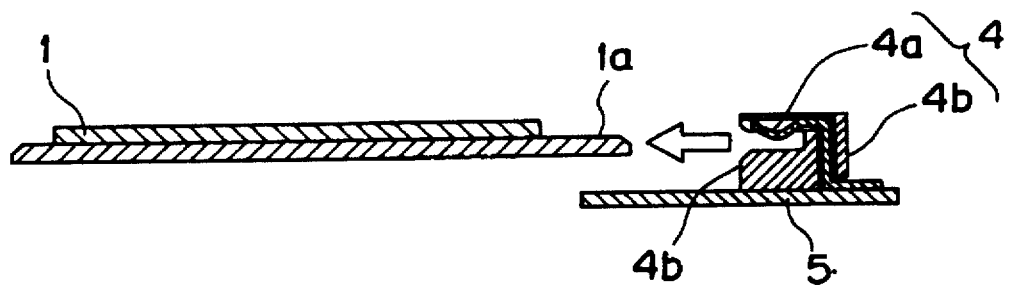
FIG. 2 is a sectional view taken along a line A—A in FIG. 1.
Figure 3:
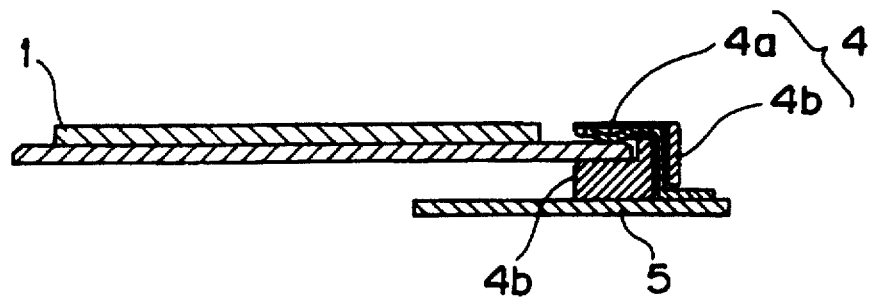
FIG. 3 is a sectional view taken along the line A—A in FIG. 1 in the event where the liquid crystal display panel is connected with the circuit board.

FIG. 1 is a perspective view showing a connecting state of a liquid crystal display panel and a circuit board having a connector thereon in accordance with the present invention. FIGS. 2 and 3 are sectional views taken along a line A—A in FIG. 1. In a liquid crystal display device in accordance with an embodiment of the invention, as shown in FIGS. 1 to 3, a liquid crystal display panel 1 is loaded with driver LSIs 1b outputting a signal for driving picture elements. A signal input electrode portion 1a formed on the liquid crystal display panel 1 is detachably inserted into, from the side of the liquid crystal display panel 1, and connected to a connector 4 mounted on a circuit board 5 for supplying electric power and input signals to the liquid crystal display panel 1. The connector 4 has a conductive contact 4a which comes in pressure contact with the signal input electrode portion 1a when the liquid crystal display panel 1 and the circuit board 5 are connected to each other.

The driver LSIs 1b for driving picture elements are fixed on the liquid crystal display panel 1 with a silver alloy paste or the like. The signal input electrode portion 1a through which electric power for operating the driver LSIs 1b, clocks, start pulses, video signals, common electric power to opposing electrodes and the like are supplied and inputted is provided on one side of the liquid crystal display panel 1. The connector 4 mounted on the circuit board 5 is fitted to the signal input electrode portion 1a of the liquid crystal display panel 1, as shown in a sectional view of FIG. 2, while the connector 4 has the conductive contact 4a which is able to form pressure contact with the signal input electrode portion 1a.

Accordingly, the power supply and signal input to the liquid crystal display panel 1 from the circuit board 5 are performed by way of the conductive contact 4a. The conductive contact 4a is formed of copper or the like, plated with gold, nickel, or solder. As shown in FIG. 2, the conductive contact 4a is covered and supported by a supporting member 4b formed of a mold material. That is, the connector 4 is composed of the conductive contact 4a and the supporting member 4b.

The connection between the liquid crystal display panel 1 and the circuit board 5 is performed by slidingly inserting the circuit board 5 having the connector 4, in the direction of an arrow in FIG. 2, to thereby form a structure shown in FIG. 3. Here, since the conductive contact 4a is covered with the supporting member 4b to support it, the leaf spring portion of the conductive contact 4a is bent to cause a mechanical pressure pertinent to the electric connection between the signal input electrode portion 1a of the liquid crystal display panel 1 and the conductive contact 4a. By this function, it is possible to obtain good connection resistance between the liquid crystal display panel 1 and the circuit board 5 without providing any mechanical pressure by other member. Further, this configuration allows the liquid crystal display panel 1 or the connector 4 to be slidingly inserted into the other and separated from the other.

Further, the connector 4 is directly provided on the circuit board as shown in FIG. 1 and is fitted to the signal input electrode portion 1a of the liquid crystal display panel 1 by slidingly inserting the circuit board 5 in the side direction. Conversely, the liquid crystal display panel 1 may be inserted into the connector 4 of the circuit board 5. The above connecting method allows the operation of the liquid crystal display panel 1 only if the liquid crystal display panel 1 is connected with the circuit board 5 through the connector 4, and therefore there is no need to provide a flexible board, connecting cables and the like which are needed in the conventional method.

Figure 4:
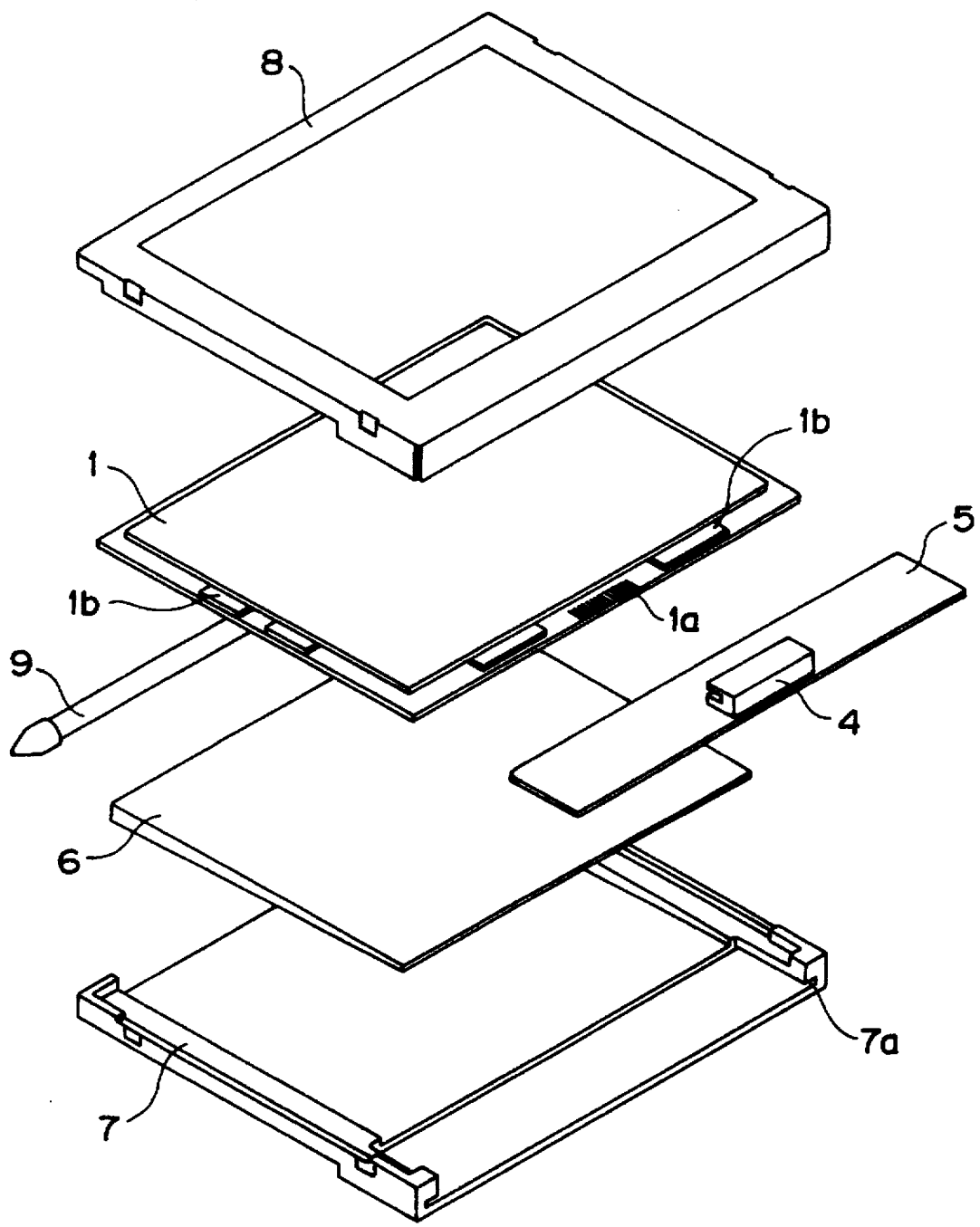
FIG. 4 is an exploded perspective view showing an embodiment of a liquid crystal display device in accordance with the present invention.
Figure 5:
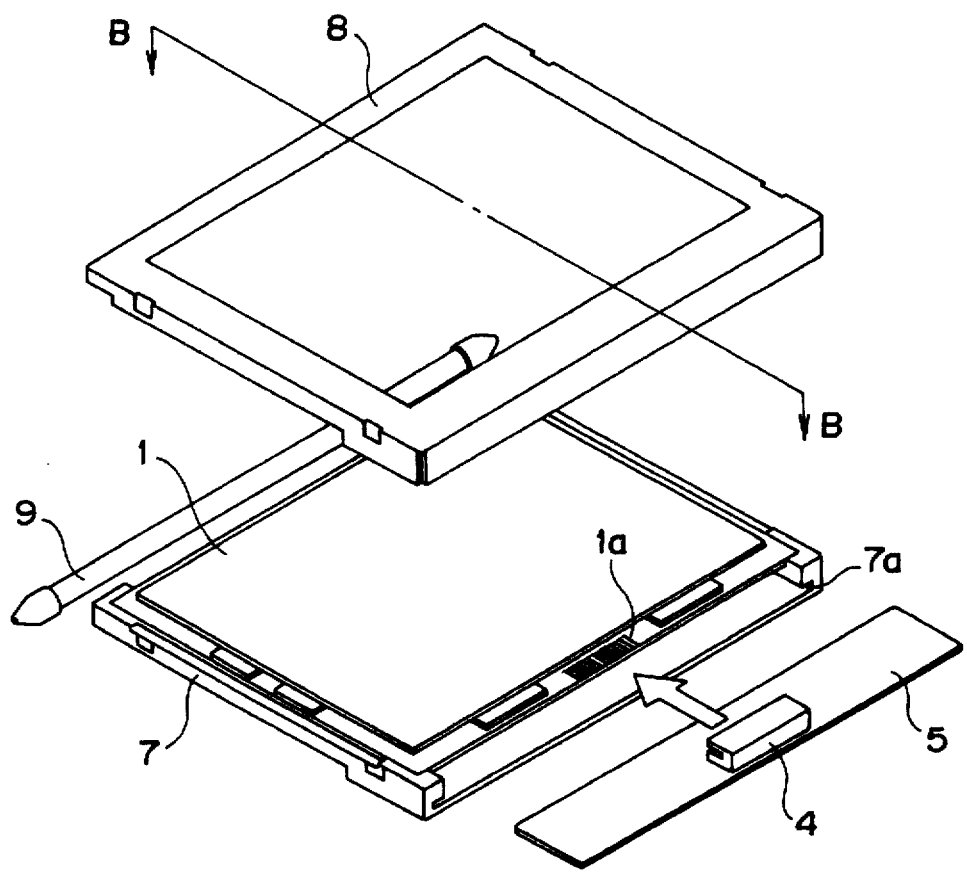
FIG. 5 is a perceptive view showing an assembling situation of an embodiment of a liquid crystal display device in accordance with the present invention.
Figure 6:
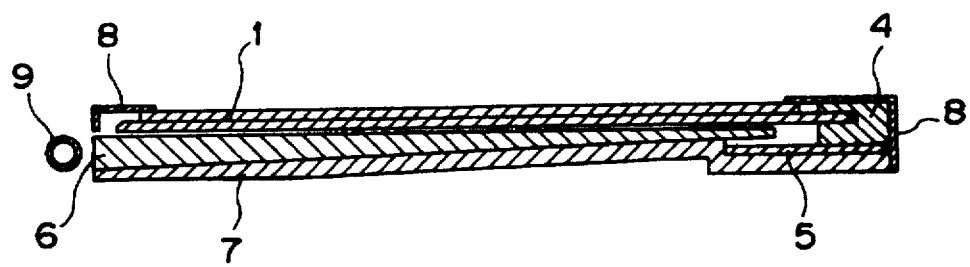
FIG. 6 is a sectional view taken along a line B—B in FIG. 5.
Figure 7:
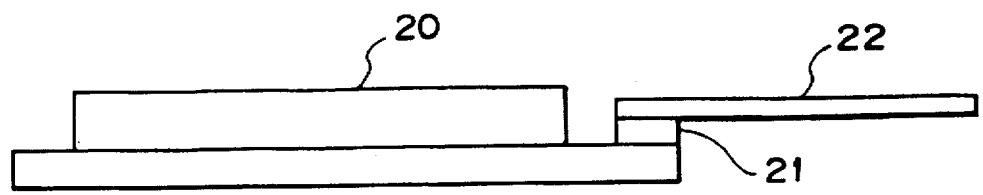
FIG. 7 is a schematic sectional view showing a mounting structure of a conventional liquid crystal panel.

FIG. 4 is an exploded perspective view showing the embodiment of the liquid crystal display device according to the invention. FIG. 5 is a perspective view showing an assembling situation of the embodiment of the liquid crystal display device according to the invention. FIG. 6 is a sectional view taken along a line B—B in FIG. 5.

As shown in FIGS. 4 through 6, a back-light guiding plate 6 for edge light type having a tapering shape is disposed on the opposite side of the display screen of the liquid crystal display panel 1. This plate 6 is tapered from one side to the other. The back-light guiding plate 6 is placed on a backside casing 7 which has board inserting grooves 7a for allowing the circuit board 5 to be inserted, thus forming a stack structure. Here, the back-light guiding plate 6 having a tapering shape is placed as seen in FIGS. 4 and 6. Specifically, the back-light guiding plate 6 is placed on the backside casing 7 so that the back-light guiding plate 6 is gradually reduced in thickness toward the site of the connector 4 provided on the circuit board 5 to be slidingly inserted into and connected to the signal input electrode portion 1a of the liquid crystal display panel 1.

After the liquid crystal display panel 1, the back-light guiding plate 6 and the backside casing 7 have been assembled as shown in FIG. 5, the circuit board 5 is inserted along the board inserting grooves 7a formed in the backside casing 7 from the side direction indicated by an arrow in FIG. 5, so that the circuit board 5 is connected with the liquid crystal display panel 1 through the connector 4. Thus, the signal input electrode portion 1a is connected to the conductive contact 4a with each electrode fitted in properly (FIGS. 2 and 3). Finally, as shown in FIGS. 4 and 5, the front-side casing 8 is attached to the backside casing 7 from the display screen side of the liquid crystal display panel 1 so that each component is held inside. Here, the back-light guiding plate 6 is to emit two-dimensional light which is created by utilizing the repeated reflection and refraction of a linear light source of a fluorescent tube or the like and the plate 6 is formed of a transparent resin, glass plate or the like. The front-side casing 8 and the backside casing 7 are to hold and shield inside components such as the liquid crystal display panel 1, the back-light guiding plate 6, the circuit board 5 and the like.

As mentioned above, this embodiment uses a back-light of edge light type. As shown in FIG. 6, a back-light lamp 9 is disposed on the thicker side of the back-light guiding plate 6 having a tapering shape while the circuit board 5 is disposed on the opposite side of the illuminating surface of the back-light guiding plate 6 along the tapered side thereof. In this arrangement, the thickness of the circuit board 5 is set up smaller than that of the thicker side of the back-light guiding plate 6, whereby it is possible to make the liquid crystal display device thinner than the configuration in which a flat back-light guiding plate is used. Further, since part of the circuit board 5 is located on the opposite side of the illuminating surface of the back-light guiding plate 6, it is possible to reduce the area of the screen-side surface of the liquid crystal display device as compared to the configuration in which the circuit board 5 is disposed in the same level as the liquid crystal display panel 1.

As is apparent from FIG. 6, the front-side casing 8 is attached on the display screen side of the liquid crystal display panel 1, whereby the circuit board 5 and the liquid crystal display panel 1 connected to each other by the connector 4 are held and fixed by the inside surface of the front-side casing 8. The liquid crystal display panel 1 and the back-light guiding plate 6 are sandwiched and secured by the front-side casing 8 and the backside casing 7. Further, in the liquid crystal display device of this embodiment, since the backside casing 7 on the side of the back-light guiding plate 6 is formed of a light-reflective material, the amount of reflected light on the rear and side surfaces of light-reflective surfaces in the back-light guiding plate 6 increases, so that it is possible to improve the light utility efficiency of the back-light. Accordingly, the reflective sheet which has been provided on the rear surface of the back-light guiding plate in the conventional configuration is no more needed. Specific examples of the light-reflective material include a highly reflective grade polycarbonate.

What is claimed is:

1. A liquid crystal display device, comprising:
   a liquid crystal display panel having a circuit outputting signals for driving picture elements;
   a circuit board for supplying electric power and input signals to said liquid crystal display panel;
   a signal input electrode portion formed on said liquid crystal display panel, said signal input electrode portion receiving the electric power and the input signals supplied from said circuit board;
   a connector mounted on said circuit board, wherein said signal input electrode portion is detachably inserted into and connected to said connector so as to electrically connect said circuit board with said liquid crystal display panel;
   a back-light guiding plate disposed between said circuit board and said liquid crystal display panel for emitting light from the whole surface thereof, said liquid crystal display panel being connected to said circuit board through said connector, said back-light guiding panel having a taper gradually reducing in thickness toward said connector;

said connector comprising a conductive contact coming into pressure contact with said signal input electrode portion when said liquid crystal display panel is connected with said circuit board; and a supporting member formed of a mold material for supporting said conductive contact.

2. A liquid crystal display device, comprising:

a liquid crystal display panel having a circuit outputting signals for driving picture elements;

a circuit board for supplying electric power and input signals to said liquid crystal display panel;

a signal input electrode portion formed on said liquid crystal display panel, said signal input electrode portion receiving the electric power and the input signals supplied from said circuit board;

a connector mounted on said circuit board, wherein said signal input electrode portion and said connector are detachably inserted and slidably connected to one another so as to electrically connect said circuit board with said liquid crystal display panel; and a back-light guiding plate disposed between said circuit board and said liquid crystal display panel for emitting light from the whole surface thereof, said liquid crystal display panel being connected to said circuit board through said connector, said back-light guiding plate having a taper gradually reducing in thickness toward said connector, said liquid crystal display panel, said circuit board and said back-light guiding plate being disposed in generally parallel relation relative to one another, with at least portions lying in generally parallel overlapping relation to one another.

3. A liquid crystal display device according to claim 2 wherein said liquid crystal display panel and said circuit board are in spaced overlying relation to one another when the signal input electrode portion is inserted into and connected to said connector, said tapered back-light guiding plate having an end of reduced thickness disposed between said liquid crystal display panel and said circuit board.

4. A liquid crystal display device, comprising:

a liquid crystal display panel having a circuit outputting signals for driving picture elements;

a circuit board for supplying electric power and input signals to said liquid crystal display panel;

a signal input electrode portion formed on said liquid crystal display panel, said signal input electrode portion receiving the electric power and the input signals supplied from said circuit board;

a connector mounted on said circuit board, wherein said signal input electrode portion is detachably inserted into and connected to said connector so as to electrically connect said circuit board with said liquid crystal display panel;

a back-light guiding plate disposed between said circuit board and said liquid crystal display panel for emitting light from the whole surface thereof, said liquid crystal display panel being connected to said circuit board through said connector, said back-light guiding panel having a taper gradually reducing in thickness toward said connector;

a backside casing having board inserting grooves enabling insertion of said circuit board therein and placement of said back-light guiding plate therein; and a front-side casing attached to said backside casing so as to cover both said liquid crystal display panel and said circuit board, wherein said liquid crystal display panel is placed on said back-light guiding plate and said circuit board is connected to said liquid crystal display panel through said connector by inserting said circuit board into said backside casing along said board inserting grooves formed on said backside casing.

5. A liquid crystal display device according to claim 4, wherein said connector comprises: a conductive contact coming into pressure contact with said signal input electrode portion when said liquid crystal display panel is connected with said circuit board; and a supporting member made of a mold material for supporting said conductive contact.

6. A liquid crystal display device according to claim 4, wherein said backside casing facing the back-light guiding plate comprises a light-reflective material.

* * * * *